United States Patent
Thorne

(10) Patent No.: US 11,180,981 B2
(45) Date of Patent: Nov. 23, 2021

(54) SYSTEM AND METHOD FOR AUTOMATED POST-GEOSTEERING

(71) Applicant: CHEVRON U.S.A. INC., San Ramon, CA (US)

(72) Inventor: Julian A. Thorne, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 128 days.

(21) Appl. No.: 16/673,691

(22) Filed: Nov. 4, 2019

(65) Prior Publication Data

US 2020/0165911 A1     May 28, 2020

Related U.S. Application Data

(60) Provisional application No. 62/772,410, filed on Nov. 28, 2018.

(51) Int. Cl.
| | |
|---|---|
| *E21B 44/00* | (2006.01) |
| *E21B 7/04* | (2006.01) |
| *E21B 49/00* | (2006.01) |
| *G01V 99/00* | (2009.01) |

(52) U.S. Cl.
CPC .............. *E21B 44/00* (2013.01); *E21B 7/04* (2013.01); *E21B 49/00* (2013.01); *G01V 99/005* (2013.01)

(58) Field of Classification Search
None
See application file for complete search history.

(56) References Cited

U.S. PATENT DOCUMENTS

| | | | |
|---|---|---|---|
| 8,794,353 B2* | 8/2014 | Benson | E21B 47/06 175/61 |
| 10,012,028 B2 | 7/2018 | Johnson et al. | |
| 2005/0171698 A1 | 8/2005 | Sung et al. | |
| 2014/0196953 A1* | 7/2014 | Chitwood | E21B 21/10 175/57 |
| 2017/0081953 A1 | 3/2017 | Benson et al. | |

FOREIGN PATENT DOCUMENTS

| | | |
|---|---|---|
| WO | 2014/160741 | 10/2014 |
| WO | 2017116436 A1 | 7/2017 |

OTHER PUBLICATIONS

Jindrich Hladil, Martin Vondra, Petr Cejchan, Robert Vich, Leona Koptikova & Ladislav Slavik, "The Dynamic Time-Warping Approach to Comparison of Magnetic-Susceptibility Logs and Application to Lower Devonian Calciturbidites" Geologica Belgica (2010) 13/4: 385-406.
PCT International Search Report and Written Opinion, dated Dec. 13, 2019, issued in International Application No. PCT/IB2019/059442, filed on Nov. 4, 2019, 12 pages.

* cited by examiner

*Primary Examiner* — Roy Y Yi
(74) *Attorney, Agent, or Firm* — Marie L. Clapp

(57) ABSTRACT

A method is described for automated post-geosteering including receiving a pilot well log and a lateral well log with an initial lateral well path; performing automated post-geosteering to generate a corrected well path image; and displaying the corrected well path image on a graphical display. The method may be executed by a computer system.

2 Claims, 3 Drawing Sheets

SYSTEM AND METHOD FOR AUTOMATED POST-GEOSTEERING

CROSS-REFERENCE TO RELATED APPLICATIONS

This application claims priority from U.S. Provisional Application 62/772,410 filed Nov. 28, 2018.

STATEMENT REGARDING FEDERALLY SPONSORED RESEARCH OR DEVELOPMENT

Not applicable.

TECHNICAL FIELD

The disclosed embodiments relate generally to techniques for post-geosteering of wells drilled to produce hydrocarbons and, in particular, to a method of automated post-geosteering using dynamic programming.

BACKGROUND

In general, producing (i.e. extracting) hydrocarbons from the subsurface is done using wells drilled into the rock layer(s) that contain those hydrocarbons. The wells may be substantially vertical and/or lateral. Lateral wells may even be substantially horizontal. However, it is known that as a drill bit penetrates the subsurface, the wellbore will deviate from the simple path that is imagined by the driller. These deviations can result in the wellbore being meters away from the intended target rock layers.

Post-geosteering (also called retro-steering) is the process of correlating a lateral well log to a nearby vertical pilot well to determine the path of the well relative to stratigraphic layers sampled by the pilot well. An algorithm called dynamic time-warping is well-known for solving for a simple stretch and squeeze mapping between two time-series and in well-log correlation (Hladil, 2010). However, since lateral wells can go both up and down along their roughly horizontal section, correlation is not a simple stretch and squeeze of the log but requires a complex mapping function to achieve optimum correlation. Determining the path of the well relative to stratigraphic layers is critical during the drilling process which targets specified stratigraphic layers as optimum for hydrocarbon production. If the relative stratigraphic position indicates that the drill bit is above (or below) the target layer then a decision is made to rectify the drilling direction to bring the path back down (or up) to the correct position. The current state-of-the-art process involves 24-hour manual interpretation as the well is being drilled using commercial software that facilitates graphical correlation.

There exists a need for improved post-geosteering in order to more accurately place wellbores for the purpose of extracting hydrocarbons from the subsurface.

SUMMARY

In accordance with some embodiments, a method of automated post-geosteering including receiving a pilot well log and a lateral well log with an initial lateral well path; performing, via the computer processor, automated post-geosteering using the pilot well log, lateral well log, and initial lateral well path as input to generate a corrected lateral well path image; and displaying, on a graphical display, the corrected lateral well path image is disclosed. The automated post-geosteering may include computing a cost matrix between log values of each sample on the pilot well log versus each sample on the lateral well log using a standard deviation of the pilot well log and a standard deviation of lateral well log and adjusting the initial well path based on the cost matrix and parameters controlling smoothness and adherence to the initial lateral well path to generate the corrected lateral well path image. The method may also include interpreting the corrected lateral well path image to identify actions to change a drilling path or report a final post-geosteering path.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Figure 1:
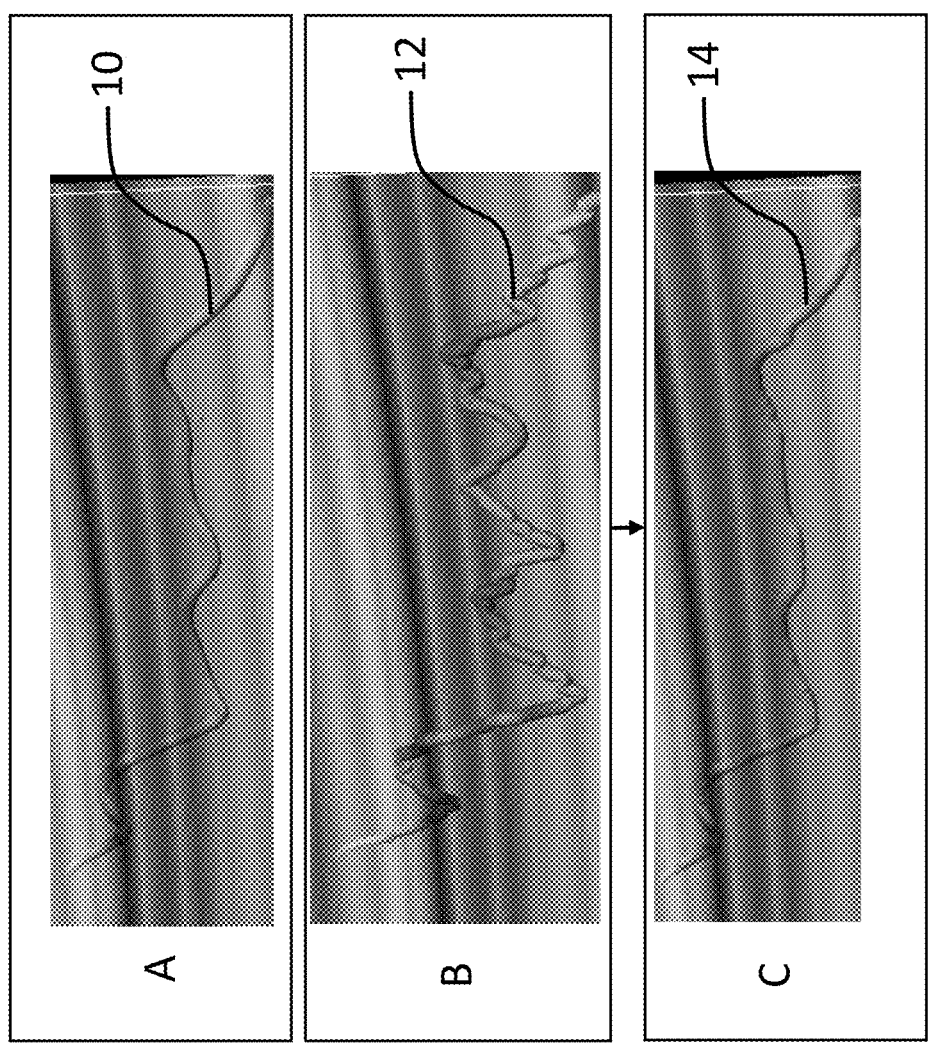
FIG. 1 shows a synthetic example of the result of the method, in accordance of some embodiments.

Described below are methods, systems, and computer readable storage media that provide a manner of automated post-geosteering. These embodiments are designed to be of particular use for automated post-geosteering in order to trigger various changes to drilling paths.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

This invention describes a method for post-geosteering including an algorithm that can automate post-geosteering. Geosteering is the engineering process of steering a well to target specific geologic layers. Post-geosteering is an ongoing process while the well is being drilled. After the well has been partially drilled, the logs collected so far are used to post-geosteer and correct the drilling path. Post-geosteer is a shortened term for the more complete phrase post-partial geosteer. In contrast, there is a technique referred to as "retrosteer" which means update the wellpath after the whole well has been drilled to better fit the observed logs. However, this invention emphasizes post-geosteering and its link to decisions to change the drilling path. Importantly, if a well is post-geosteered while drilling more effectively using this invention, this process can then be used to forward geosteer the well for a likely optimum productive path. The proposed method updates the well path with respect to a static structural earth model such that the model of the formation is not updated. As such it is distinct from any previous work in this area such as US 2005/0171698A1 or WO2014160741A1, although the descriptions provided in these provide background to the technical problem of geosteering and its relationship to hydrocarbon production. The present invention uses dynamic programming to post-geosteer the well-path which allows it to solve for the highly complicated correlation problem.

The method begins with a vertical pilot well from which well logs are obtained. These well logs may include gamma ray logs, resistivity logs, and the like. Those of skill in the art will be aware of how such well logs can be interpreted to develop an earth model. A lateral well can then be drilled, with at least one well log of the same type as the pilot well obtained (the most common being gamma-ray). An initial lateral well path is obtained based on the gyroscopic measurement of the inclination and dip as the well is being drilled of the trajectory of the drill bit, such as the one shown in FIG. 1 panel B. The measured inclination and dip along the well path have significant uncertainty so the initial lateral well path has significant uncertainty.

After well logs are obtained in the lateral well and the initial lateral well path is obtained, the automated post-geosteering process may begin. The automated post-geosteering process may use some parameters that encourage smoothness of the corrected well path (smoothbias) or encourage the corrected well path to be close to the initial lateral well path (pathbias). The smoothbias and pathbias parameters may be set by the computer or may be specified by the user. Automated post-geosteering may, for example, be performed by:

1. Computing a cost matrix cost[n][ns] between the log values of each sample n on the pilot well versus each sample ns on the lateral well using the standard deviation of the pilot well log ($\sigma_p$) and the standard deviation of the lateral well log ($\sigma_{lat}$), such as $$\text{cost}[n][ns] = \text{abs}\left(\frac{\text{pilot}[n]}{\sigma_p} - \frac{\text{lat}[ns]}{\sigma_{lat}}\right)$$

2. For each lateral well sample ns from 0 to nseg (where nseg is the number of samples on the lateral well-1) on the lateral well:

If $ns=0$, mincost[$n$][0]=cost[$n$][0]+pathbias*$n$ for each sample n on the pilot well from 0 to nw, where nw is the number of samples on the pilot well-1)
else:
  scan over index m from 0 to nseg to find the index minpath[n][ns] that minimizes mincost[m] [ns−1]+cost[n][ns]+smoothbias*abs(m−n) and set mincost[n][ns] to the minimum value+pathbias*abs(pathw[ns]−n) where pathw is the initial well path of the lateral well converted from depth to pilot well sample index 3. Find the index bestw[nseg] of the lowest mincost on the last lateral well sample
4. Backtrack the optimum correlation path using bestw [ns−1]=minpath[bestw[ns]][ns]

After the post-geosteering is done, one or more of the following actions are performed as preparation to changing the drilling path:

1. Recycle warning (significantly different geosteer is possible by comparing auto-correlation solutions to current user interpretation). A visual or auditory warning is issued alerting the geosteering team that the well may be currently off target because it has been geosteered with a potentially faulty correlation to the pilot well. The team makes a decision to correct the drilling path or ignore the warning.

2. Shift change rationalization of alternative user geosteer solutions. During round-the-clock geosteering, during geologist shift changes each geologist will have their separate opinion of the correlation of the lateral to the pilot well. The automated post-geosteering solution provides an objective solution that can be adopted (or partially adopted) to rationalize the two opinions. This is particularly important when rationalizing the two opinions is problematic and causing delay in updating the drilling path.

3. Alternative geosteer solutions starting from the user's interpretation taken back to an earlier time (e.g. 450 feet of drilling earlier). The likelihood of achieving an optimum drilling path is enhanced by allowing the geologist manually correlating the lateral to the pilot well to consult the automated solution starting from the user's interpretation taken back to an earlier time. If the automated solution differs the geologist can decide to rectify his current solution causing the geosteering team to correct their current drilling path.

4. Fine-tuning of model-path relative dip changes within each manually picked segment. Graphical manual correlation tools rely on the geologist picking a small number of correlation tie-points forming linearly interpolated segments between each tie-point. The automated solution described here can be utilized to adjust the correlation path away from simple linear interpolation in each segment.

5. Adjusting of the post-geosteering path required after getting down-hole gamma instead of real-time MWD gamma used for geosteering. A final post-geosteering path is a reporting requirement when a well has completed drilling. These reports are used in post-mortem analysis that are part of optimizing the plan for the next wells to be drilled on the same pad. The use of the automated post-geosteering process described here can speed up the report process.

As described above the interpretation made possible by automated post-geosteering allows the user to evaluate uncertainty, rationalize existing alternatives or suggest others, add objectivity, and speed up the process.

FIG. 1 shows a synthetic example of the method. Panel A shows the synthetic truth model with the synthetic rock properties shown in 2-D as varying grey shades and the synthetic well path 10 (i.e., the correct well path) with well log values matching the rock properties along the synthetic well path. Panel B shows the same 2-D rock property model with the initial lateral well path 12 with the correct synthetic well log values. This initial lateral well path and the synthetic well log values are input into the automated post-geosteering method described above to produce the correct well path 14 in panel C. The corrected well path 14 is very similar to the synthetic well path 10.

Figure 2A:
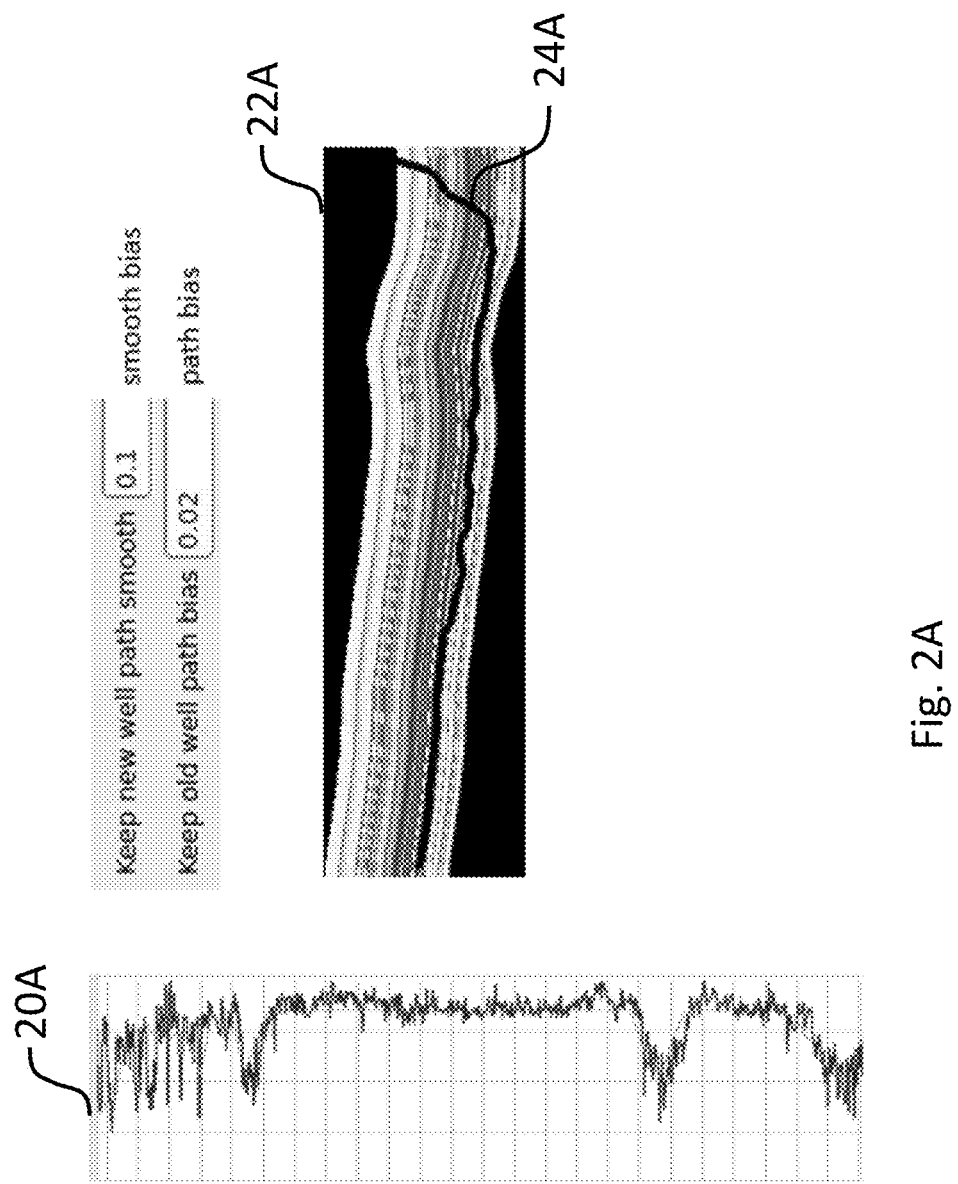
FIG. 2A is an example of an embodiment of the method, in accordance of some embodiments.
Figure 2B:
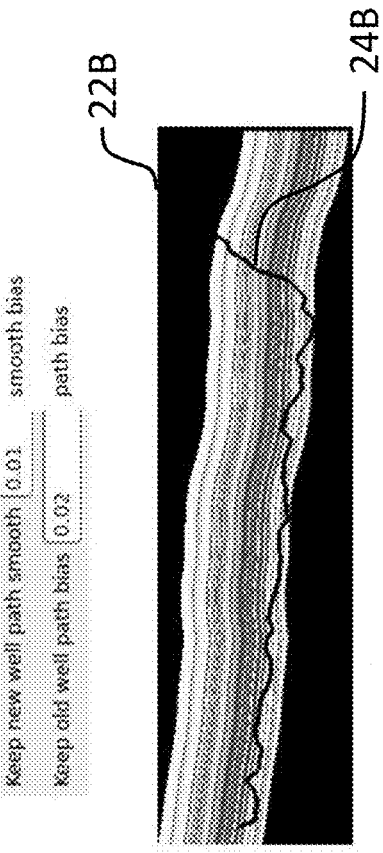
FIG. 2B is an example of an embodiment of the method, in accordance of some embodiments.
Figure 2B:
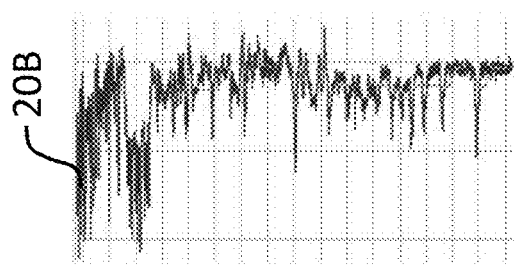
Figure 2C:
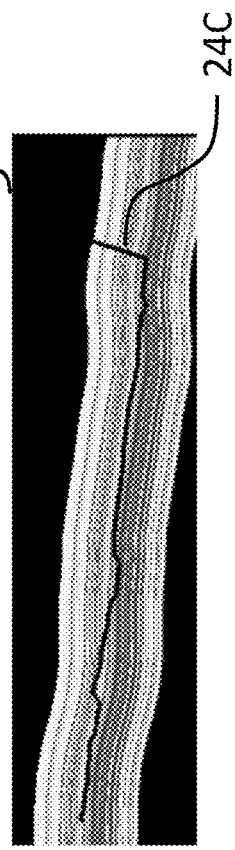
FIG. 2C is an example of an embodiment of the method, in accordance of some embodiments.
Figure 2C:
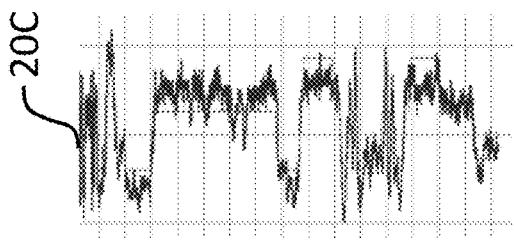

FIGS. 2A-2C show three field case examples of post-geosteering the well-path of three lateral wells through a gamma property model created from a pilot well. The smoothness and path bias values used are shown for each case. The predicted well-path 24A, 24B, and 24C is shown for each lateral well on a cross-section of the gamma property model 22A, 22B, and 22C, respectively. The well logs 20A, 20B, and 20C show predicted gamma log calculated from the post-geosteered well-path in the model is shown in light grey versus the observed gamma log in dark grey.

In some embodiments, the method described herein may be executed on a computer system that includes one or more processing units (CPUs), one or more network interfaces and/or other communications interfaces, memory, and one or more communication buses for interconnecting these and various other components. The computer system may also include a user interface (e.g., a graphical display and an input device). The communication buses may include circuitry (sometimes called a chipset) that interconnects and controls communications between system components. Memory includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory may optionally include one or more storage devices remotely located from the CPUs. Memory, including the non-volatile and volatile memory devices within memory, comprises a non-transitory computer readable storage medium and may store well logs and/or geologic structure information.

In some embodiments, memory or the non-transitory computer readable storage medium of memory stores the following programs, modules and data structures, or a subset thereof including an operating system, a network communication module, and a post-geosteering module.

The operating system includes procedures for handling various basic system services and for performing hardware dependent tasks.

The network communication module facilitates communication with other devices via the communication network interfaces (wired or wireless) and one or more communication networks, such as the Internet, other wide area networks, local area networks, metropolitan area networks, and so on.

In some embodiments, the post-geosteering module executes the operations of method described herein. Post-geosteering module may include a data sub-module, which handles the data required and produced in some embodiments. This data is supplied by the data sub-module to other sub-modules.

The post-geosteering module may optionally be able to generate a display that would be sent to and shown on the user interface display. In addition, any of the data or processed data products may be transmitted via the communication interface(s) or the network interface and may be stored in memory.

The post-geosteering method is, optionally, governed by instructions that are stored in computer memory or a non-transitory computer readable storage medium and are executed by one or more of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, the method is described as being performed by a computer system, although in some embodiments, various operations of the method are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

REFERENCES

Sung and Lewis US 2005/0171698A1
Priezzhev et al. WO2014160741A1
Jindrich HLADIL, Martin VONDRA, Petr CEJCHAN, Robert VICH, Leona KOPTIKOVA & Ladislav SLAVIK, The dynamic time-warping approach to comparison of magnetic-susceptibility logs and application to Lower Devonian calciturbidites. GEOLOGICA BELGICA (2010) 13/4: 385-406

What is claimed is:

1. A computer-implemented method of automated post-geosteering, comprising:
   a. receiving, at a computer processor, a pilot well log and a lateral well log with an initial lateral well path;
   b. performing, via the computer processor, automated post-geosteering using the pilot well log, lateral well log, and initial lateral well path as input to generate a corrected lateral well path image;
   c. interpreting the corrected lateral well path image to identify actions to change a drilling path or report a final post-geosteering path wherein the actions include one or more of a recycle warning, a shift change rationalization, an alternative geosteer solution from an interpretation at an earlier time, and fine-tuning of model-path relative dip changes; and
   d. displaying, on a graphical display, the corrected lateral well path image.

2. The method of claim 1 wherein the automated post-geosteering comprises:
   a. computing a cost matrix between log values of each sample n on the pilot well log versus each sample ns on the lateral well log using a standard deviation of the pilot well log $\sigma_p$ and a standard deviation of lateral well log $\sigma_{lat}$; and
   b. adjusting the initial well path based on the cost matrix and parameters controlling smoothness and adherence to the initial lateral well path to generate the corrected lateral well path image.

* * * * *